United States Patent [19]

Hoshino

[11] 4,449,440

[45] May 22, 1984

[54] ADJUSTABLE STAND FOR HIGH-HAT CYMBAL

[75] Inventor: Yoshihiro Hoshino, Nagoya, Japan

[73] Assignee: Hoshino Gakki Company, Limited, Japan

[21] Appl. No.: 431,018

[22] Filed: Sep. 30, 1982

[30] Foreign Application Priority Data

Nov. 30, 1981 [JP] Japan ................................ 56-178346

[51] Int. Cl.$^3$ ................................ G01D 13/00

[52] U.S. Cl. ................................ 84/422 R

[58] Field of Search ................................ 84/422 H

[56] References Cited

U.S. PATENT DOCUMENTS 3,147,661 9/1964 Padera ................................ 84/422 H 3,464,305 9/1969 Meazzi et al. ................................ 84/422 H 4,145,951 3/1979 Hobayashi ................................ 84/422 H

*Primary Examiner*—Donald A. Griffin

*Attorney, Agent, or Firm*—Ostrolenk, Faber, Gerb & Soffen

[57] ABSTRACT

A high-hat cymbal stand is disclosed. The upper starting position of the pivotable pedal for operating the cymbals into contact, is adjustable. The tension spring for returning the pedal to its upper position is in a container which is clampable to the stand at selected vertical heights. The pedal is raised until it contacts the bottom of the adjustable spring container, whereby the height of the start position of the pedal is adjustable. Independently, the tension of the spring in the spring container is adjustable. The spring container is located next to and parallel to the rod connecting the movable cymbal to the pedal.

12 Claims, 4 Drawing Figures

ADJUSTABLE STAND FOR HIGH-HAT CYMBAL

BACKGROUND OF THE INVENTION

The invention relates to a stand for a high-hat cymbal and particularly to means for adjusting the initial tilt angle of the foot pedal for operating the cymbal.

A high-hat cymbal is foot-pedal operated, and includes two cymbals that are banged together when the foot pedal, which is attached to one of the cymbals by a rod, is operated by a performer. Typically, the cymbals are banged together as the foot pedal is moved down. An adjustable force spring device is connected to the pedal and to the rod which moves the one cymbal for driving the cymbals away from each other when the foot pedal is released. The force which the performer must exert on the pedal to bang the cymbals together is adjusted with the adjustable force spring device. Typically, the adjustable force spring device is arranged next to and exerts its force parallel to the rod connected with the movable cymbal, and the spring is joined to that rod through intermediate connecting elements.

Usually, the foot pedal, which is connected with both the rod which moves the movable cymbal and with the adjustable spring which controls the pedal pressure, is pivotally connected to a base and is also connected by an appropriate articulated connection to the rod and to the parallel adjustable force spring device, whereby the pedal pivots down and up under the influence of the performer's foot and the return spring.

Although the spring force of the return spring is adjustable, the total arcuate length of the angle over which the foot pedal must pivot before it has moved sufficiently to cause the cymbals to bang together is not adjustable. In some cases where the angle of the arc is adjustable, the adjustment is obtained by significantly releasing the tension on the spring of the adjusting device, which is undesirable.

SUMMARY OF THE INVENTION

Accordingly, it is the primary object of the present invention to enable a musician to adjust the total pivot angle of the high-hat cymbal operating foot pedal.

It is another object of the invention to be able to make the foregoing adjustment without also having to adjust the force of the return spring which returns the foot pedal to its upraised position and which separates the cymbals.

According to the invention, the adjustable force spring device, which is arranged parallel to the rod connected with one of the cymbal portions, is movably clamped to a stationary holder at a selected vertical position with respect to the base to which the foot pedal is pivotally connected and with respect to the lowered position of the pedal for establishing a selected vertical upper start position for the foot pedal to begin its downward movement under the pressure of the performer's foot and also for the foot pedal to terminate its upward movement under the influence of the return spring. The entire adjustable force spring device is movable with respect to the holder, whereby the force of the return spring is not altered as the entire adjustable force spring device is shifted. Because the foot pedal is articulatedly connected to the spring and is moved together with the entire spring device as the initial position of the spring device is established, the initial position of the foot pedal is determined by the initial vertical position of the spring device.

The foregoing and other objects and features of the present invention will become apparent from the following description of an existing prior art cymbal stand and of an embodiment of a cymbal stand according to the invention, which are described below in conjunction with the accompanying drawings.

DESCRIPTION OF A PRIOR ART EMBODIMENT

Figure 1:
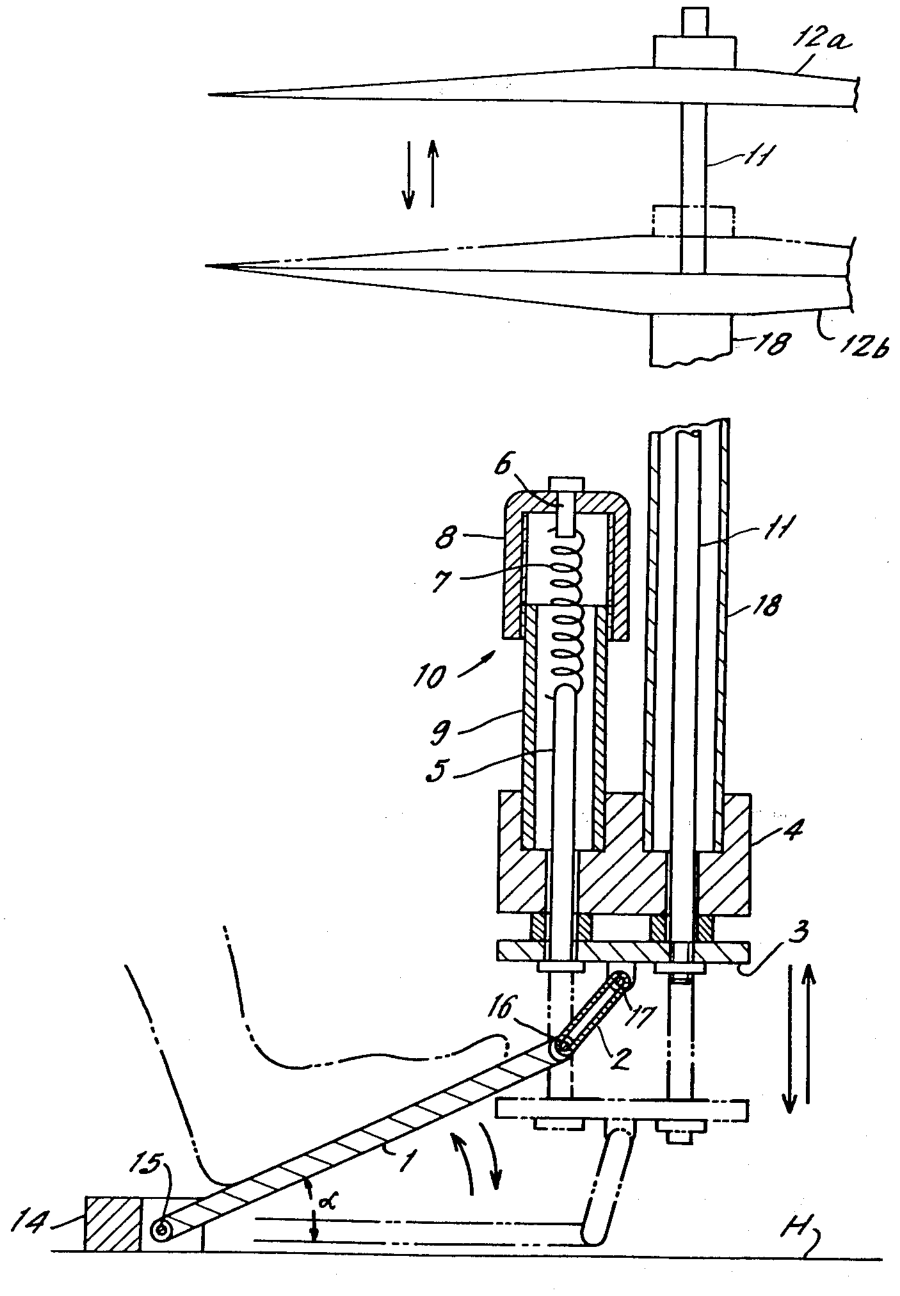
FIG. 1 (PRIOR ART)
FIG. 1 is a cross-sectional view of a prior art high-hat cymbal stand.

Referring to FIG. 1, the high-hat cymbal stand 13 is supported on legs (not shown) which support a holder 4 at a stationary height with respect to the surface H, such as a floor.

The base mount 14 for the pedal sits on the surface H. The conventional foot pedal 1 is pivotally connected at 15 to pivot with respect to the base mount 14 through the angle $\alpha$. The upraised end of the pedal 1 is articulatedly, and particularly pivotally connected at 16 with the connecting chain 2 and the chain is, in turn, pivotally or articulately connected at 17 with the rigid connecting plate 3, described further below. Because the plate 3 reciprocates vertically while the pedal 1 pivots around pivot 15, the chain 2 has the articulated connections 16 and 17 which absorb the relative motion between the pedal 1 and the plate 3.

Secured to the plate 3 is the elongate, upstanding rod 11 which moves lengthwise and vertically along with the plate 3 as the pedal 1 pivots. The stationary holder 4 defines a narrow opening bushing for the rod 11 to reciprocate through and this orients the rod so that it reciprocates vertically together with the plate 3. The rod 11 is surrounded by a sleeve 18 which is secured in the holder 4. The sleeve 18 is rigidly attached to the lower cymbal **12*b* for holding the same in fixed position. The rod 11 is secured to the upper cymbal 12*a*, so that as the rod 11 is pulled downwardly by the downward pivoting of the pedal 1, the upper and lower cymbals 12*a* and 12*b*** are banged together.

A spring adjusting device 10 operates in parallel with the rod 11 the and pedal 1 for returning the pedal 1 and thus the upper cymbal **12*a* upwardly after the cymbals have been banged together and for adjusting the pressure that a musician's foot must apply to pedal 1 to bang the cymbals together. The spring adjusting device comprises the short length spring container in the form of a pipe 9, which is fixed in position in an opening defined in the stationary holder 4. An adjusting cap 8 atop the pipe 9 is internally screw threaded to cooperate with screw threads defined on the exterior of the pipe 9 so that the height of the adjusting cap over the top of the pipe 9 can be adjusted. A first, elongate spring receiver 5 extends inside the pipe 9 and up toward the adjusting cap 8. The spring receiver 5** also extends down through the pipe 9, through a reduced size opening in the holder 4, which serves as a vertical reciprocation guide bushing for the rod 5, and the spring receiver is secured at the connecting plate 3. The bushings in the holder 4 guide both the rod 11 and the spring receiver 5 for vertical reciprocation. The plate 3 connected to both the spring receiver 5 and the rod 11 thus also reciprocates vertically.

At the top of the cap 8 is a second spring receiver 6. A coiled tension spring 7 extends between the spring receivers 5 and 6. Rotation of the screw threaded cap 8 on the screw threaded pipe 9 adjusts the height of the cap on the pipe and thereby adjusts the tension of the spring 7. Thereafter, when the pedal 1 is depressed, through the chain 2, the pedal pulls down the plate 3. This pulls down the spring receiver 5 against the tension of the spring 7 and pulls down the rod 11 to bang the cymbals 12*a*, 12*b* together. The start positions of the pedal 1, plate 3 and upper cymbal 12*a* are shown in solid lines in FIG. 1, while the terminal lowered positions of these elements are shown in broken lines in FIG. 1. Upon release of foot pressure on the pedal 1, the spring 7 returns the pedal 1 and the cymbal 12*a* to their initial position.

Because the spring adjusting device 10 is immovably supported in the stationary holder 4, and because the height of the holder is not adjustable with respect to the main supporting surface H, it has not been possible to adjust the angle $\alpha$ over which the foot pedal 1 must move from its upper, start position toward its lowered position. One undesirable way of adjusting this angle is by adjusting the adjusting cap 8 downwardly over the pipe 9 and by separating the lower portion of the spring receiver 5 from the holder 4. In this case, however, the upward return force on the foot pedal by the return spring 7 remains at the weakest level, and this prevents adjusting the pedal force in conformity with the wishes of the performer.

DESCRIPTION OF A PREFERRED EMBODIMENT

Figure 2:
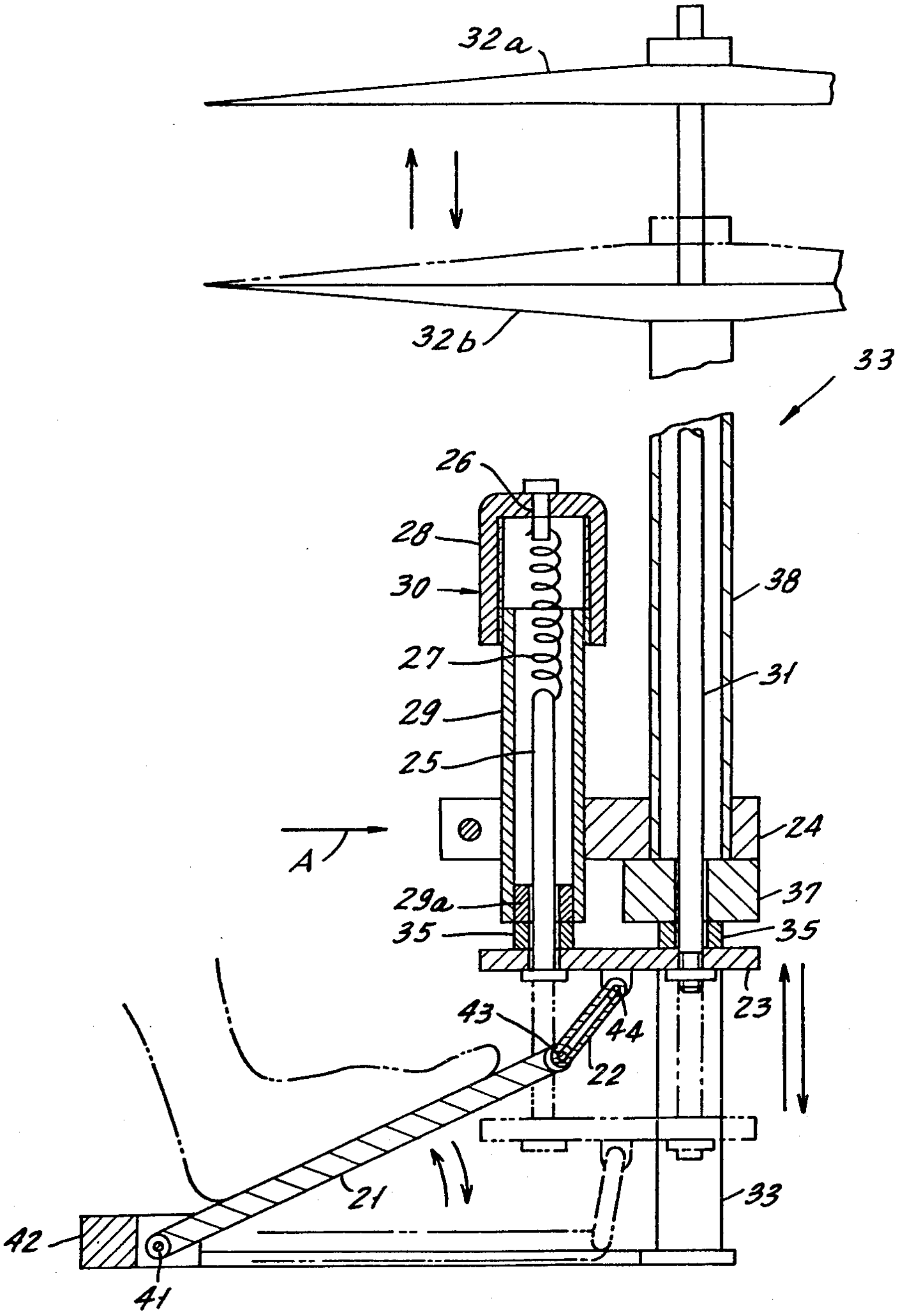
FIG. 2 is the same tye of cross-sectional view of a high-hat cymbal stand according to the invention.
Figure 3:
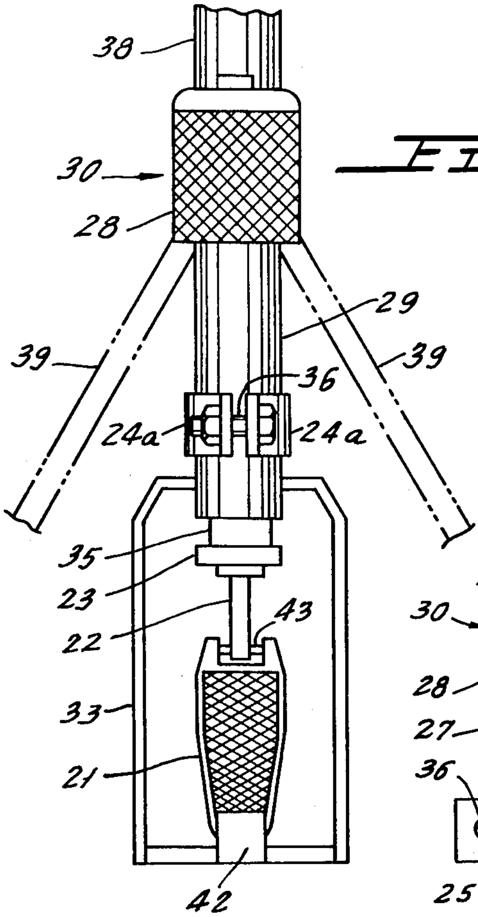
FIg. 3 is a fragmentary view of the cymbal stand shown in FIG. 2 in the direction of Arrow A in FIG. 2.

The cymbal stand shown in FIGS. 2 and 3 bears many similarities to the cymbal stand of the prior art. The high-hat cymbal stand 33 is supported on three stationary legs 39, as is conventional. The pedal 21 is pivotally connected at the pivot 41 to the base support 42 and is articulatedly connected at the articulated connection 43 to the chain 22, and the chain 22, is, in turn, articulatedly connected at the connection 44 to the vertically reciprocating connecting plate 23, so that the plate 23 reciprocates vertically as the pedal 21 pivots. The connecting rod 31 is secured to the plate 23 at one end and to the upper cymbal 32*a* at the other end, so that vertical reciprocation of the plate 23 and of the rod 31 moves the upper cymbal 32*a* down to bang against the lower cymbal 32*b*.

There is a fixedly positioned stationary holder 24 that is supported on the stand 33 against vertical movement with respect to the surface on which the stand sits. Beneath the holder 24 and supporting the same is the fixing tool and bushing 37 which is carried on the upstanding support leg 34 that sits on the surface on which the stand is positioned. The fixing tool 37 includes a narrowed opening bushing therethrough which defines a vertical reciprocating pathway for the rod 31. The cushion 35 prevents the plate 23 from banging the underside of the fixing tool 37 at the uppermost pivot position of the pedal 21.

The spring adjusting device 30 of this embodiment has most of the features of the spring adjusting device of the prior art embodiment, including the spring container in the form of the lower pipe 29, the elongate bottom spring receiver 25 in the pipe 29, the adjusting cap 28 with its upper spring receiver 26, and the adjusting cap being screw threadedly engaged with the exterior of the pipe 29 for adjusting the height of the screw cap over the pipe 29. In addition, a bushing 29*a* is installed in the bottom end of the pipe 29 with the narrowed opening for guiding the lower spring receiver for vertical reciprocation. Tension spring 27 connects the spring receivers 25 and 26. Adjustment of the height of the cap 28 above the top of the pipe 29 adjusts the force of the spring 27 and the force that is required by the performer to step down on the pedal 21 for banging the cymbals 32*a*, 32*b* together.

Upon the pedal 21 being pivoted downwardly by the foot of the musician, the plate 23 is pulled downwardly and this moves the rod 31 and the spring receiver 25 as well as the attached upper cymbal 32*a* down from the solid line positions to their broken line positions illustrated in FIG. 2. The spring 27 returns these elements to their solid line positions. The cushion 35 between the plate 23 and the bushing 29*a* prevents the plate 23 from banging against the pipe 29 as the spring 27 moves the spring retainer 25 and pedal 21 upwardly.

The holder 24 of the invention differs significantly from the holder 4 in the prior art FIG. 1. The tube 38 outside the rod 31 is affixed in the holder 24. Because the holder 24 is held stationary, the pipe 38 is held stationary. As can be seen in FIG. 3, the holder 24 comprises a bifurcated clamping unit, whose two jaws are concavely rounded at 24*a* to receive the periphery of the pipe 29 and are securely clamped together around the pipe 29 by the bolt 36, when the bolt is tightened. For adjusting the total angle over which the foot pedal 21 must move from the start, upper position to the terminal, lowered position, the bolt 36 is loosened, and the entire pipe 29 is adjusted in its vertical position with respect to the holder 24. This correspondingly adjusts the vertical position of the plate 23 which, in turn, adjusts the initial upper angular position of the pedal 21. Thereafter, the bolt 36 is tightened and this fixes the spring adjusting device 30 and the associated plate 23 resting against the cushion 25 at whatever vertical height might be desired.

In addition, the force of the spring 27 is separately adjustable by rotation of the cap 28 on the pipe 29, as described above, making two adjustments possible, the return force on the pedal 21 and the total angle over which the pedal must pivot for banging the cymbals together.

Figure 4:
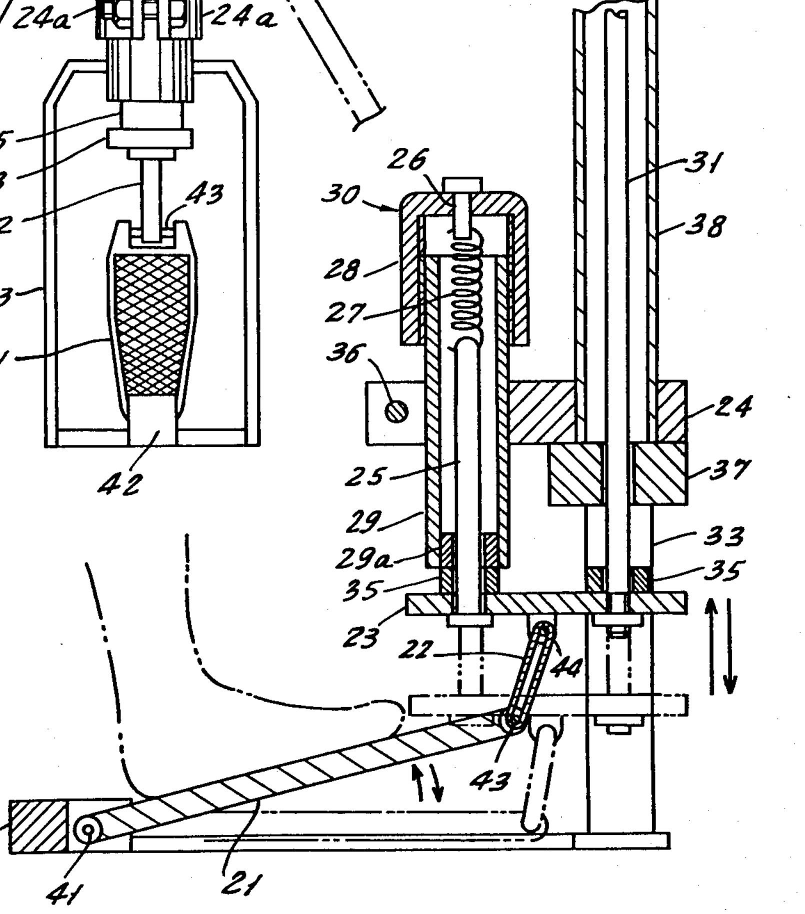
FIG. 4 is a fragmentary view of the same type as in FIG. 2 following adjustment of the initial position of the adjusting device and of the spring force of the adjusting device.

Refer to FIG. 4 which shows the same stand as in FIG. 2 with the spring adjusting device 30 shifted downwardly with respect to the holder 24 and additionally with the cap 28 at a lower height over the pipe 29, thereby reducing the force of the spring 27 in the condition of FIG. 4 as compared with its condition in FIG. 2. In comparing FIGS. 2 and 4, it can be seen that the total angle over which the pedal 21 will pivot as between the upper start position and the lowered terminal position is considerably smaller in FIG. 4 than in FIG. 2.

Although the manner of securement of the pipe 29 by the holder 24 is shown as comprising the two concavely curved jaws 24*a*, other securement methods would be apparent to one skilled in the art. For example, the holder 24 might have a hole through it defining a vertical passage through which the pipe might be shifted. A screw extending into the holder and having its inner end tightenable against the pipe 29 would secure the pipe 29 at any selected height.

Although the present invention has been described in connection with a preferred embodiment thereof, many variations and modifications will now become apparent to those skilled in the art. It is preferred, therefore, that the scope of the invention be limited not by the specific disclosure herein, but only by the appended claims.

What is claimed is:

1. A high-hat cymbal stand, comprising:

a pedal movable between an upraised, start position and a lowered position; a cymbal moving rod connected with the pedal for being movable lengthwise by movement of the pedal between its positions; a first cymbal attached to the rod for being moved by the rod as the rod moves lengthwise; a second cymbal held in position on the stand for being struck by the first cymbal as the first cymbal is moved by the pedal being moved to the lowered position of the pedal;

a spring connected with the pedal for returning the pedal to the start position and for correspondingly moving the pedal, the rod and the first cymbal together; and a pedal height adjusting device for adjusting the height of the pedal at the start position thereof, for varying the distance over which the pedal moves from the start to the lowered positions; the pedal height adjusting device comprising:

the stand including a holder fixed against movement as the pedal moves; a spring container for being secured to the holder and for containing the spring within it; clamping means for clamping the spring container to the holder at an adjustable, selected height with respect to the lowered position of the pedal; the spring container including a bottom which moves together with the spring container and the bottom being positioned for being engaged by the pedal at the start position of the pedal, whereby adjustment of the height of the spring container on the holder correspondingly adjusts the height of the bottom of the spring container and adjusts the start position of the pedal in engagement with the bottom of the spring container, and the spring in the container is readjusted in its height along with the spring container without readjustment of the spring force of the spring.

2. The cymbal stand of claim 1, wherein the pedal includes a base to which the pedal is pivotally attached for the pedal to move by pivoting over an angular distance between the start and lowered positions thereof; and the pedal being connected at an articulated connection to the spring and to the rod.

3. The cymbal stand of claim 1, wherein the pedal height adjusting device is located next to and acts in parallel with the rod; connecting means joining the rod and the spring to each other and to the pedal for causing the spring to urge the pedal to return to the start position when the pedal is moved to the lowered position thereof.

4. The cymbal stand of claim 1, further comprising spring force adjusting means in the spring container for selectively adjusting the force the spring is adapted to exert upon the pedal as the pedal is moving to the lowered position, independently of the position of the spring container with respect to the holder.

5. The cymbal stand of claim 4, wherein the pedal height adjusting device and the spring force adjusting device are both located next to and act in parallel with the rod; connecting means joining the rod and the spring to each other and to the pedal for causing the spring to urge the pedal to return to the start position when the pedal is moved to the lowered position thereof.

6. The cymbal stand of claim 5, wherein the connecting means comprises a plate, and means for guiding the plate for reciprocating for moving the rod lengthwise.

7. The cymbal stand of claim 5, wherein the pedal includes a base to which the pedal is pivotally attached for the pedal to move by pivoting over an angular distance between the start and lowered positions thereof; and the pedal being connected at an articulated connection to the spring and to the rod.

8. The cymbal stand of claim 4, wherein the spring force adjusting means comprises the spring container including a tubular body including the container bottom; the tubular body having a top, and a cap over the top of the tubular body; the spring being connected with the pedal through the bottom of the tubular body and the spring also being connected with the cap; the cap being selectively adjustable in position over the tubular body toward and away from the bottom of the tubular body, for thereby adjusting the spring force.

9. The cymbal stand of claim 8, wherein the pedal height adjusting device and the spring force adjusting device are both located next to and act in parallel with the rod; connecting means joining the rod and the spring to each other and to the pedal for causing the spring to urge the pedal to return to the start position when the pedal is moved to the lowered position thereof.

10. The cymbal stand of claim 4, wherein the pedal includes a base to which the pedal is pivotally attached for the pedal to move by pivoting over an angular distance between the start and lowered positions thereof; and the pedal being conneted at an articulated connection to the spring and to the rod.

11. The cymbal stand of claim 4, wherein the second cymbal is non-movably supported on the holder.

12. The cymbal stand of claim 4, wherein the spring is a tension spring, whose tension is increased as the pedal moves to its lowered position.

* * * * *